May 27, 1941.  C. E. KERR  2,243,463
FILLING VALVE
Filed Aug. 14, 1937   6 Sheets-Sheet 1

Fig_2.

Fig_1.

Fig_3.

INVENTOR.
Charles. E. Kerr.
BY Philip A. Minnis
ATTORNEY.

May 27, 1941.    C. E. KERR    2,243,463
FILLING VALVE
Filed Aug. 14, 1937    6 Sheets-Sheet 2

Fig_5.

Fig_4.

INVENTOR.
Charles. E. Kerr.
BY Philip A. Minnis
ATTORNEY.

Fig_6.

May 27, 1941.  C. E. KERR  2,243,463
FILLING VALVE
Filed Aug. 14, 1937  6 Sheets-Sheet 4

INVENTOR.
Charles. E. Kerr.
BY Philip A. Minnis
ATTORNEY.

May 27, 1941.　　　　C. E. KERR　　　　2,243,463

FILLING VALVE

Filed Aug. 14, 1937　　　　6 Sheets-Sheet 5

INVENTOR.
Charles E. Kerr.
BY Philip A. Minnis
ATTORNEY.

INVENTOR
Charles E. Kerr
BY
ATTORNEY

Patented May 27, 1941

2,243,463

UNITED STATES PATENT OFFICE 2,243,463

FILLING VALVE

Charles E. Kerr, Hoopeston, Ill., assignor to Food Machinery Corporation, San Jose, Calif., a corporation of Delaware Application August 14, 1937, Serial No. 159,155

29 Claims. (Cl. 226—98)

The present invention relates to liquid filling valves and is concerned more particularly with the provision of an improved valve for filling containers such as cans or the like.

It is a general object of the invention to provide an improved filling valve which is adapted for rapid operation with non-foaming characteristics.

Another general object of the invention is to provide an improved filling valve in which the bearing surfaces are remote from the liquid being handled, whereby none of the parts contacting the liquid are subject to wear and can be made of suitable non-corrosive material.

Another object of the invention is to provide a valve of the type described, which will not drip after a filling operation when the can is removed.

Another object of the invention is to provide an improved filling valve which can be readily assembled on or removed from a filling machine.

Another object of the invention is to provide an improved filling valve which can be assembled and taken apart without the use of tools.

Another object of the invention is to provide an improved filling valve which can be cleaned easily.

Other objects of the invention will appear from the following description of certain preferred embodiments thereof, as illustrated in the accompanying drawings, in which:

Fig. 1 is a transverse vertical section of a valve embodying one form of the invention, the valve being shown as assembled on the tank of a filling machine, the view being taken through the axis of the valve.

Fig. 2 is a fragmentary elevational view of the upper end of the valve.

Fig. 3 is a fragmentary horizontal section, through the lower end of the valve, and is taken in a plane indicated by the line 3—3 in Fig. 1.

The improved liquid filling valve disclosed herein may be used with various types of filling machines for either filling or syruping operations. For example, one type of machine with which the valve may be employed is disclosed in the patent to Thompson, No. 1,355,015, dated October 5, 1920, wherein a plurality of filling or syruping valves are mounted around the periphery of a tank and the cans or other containers to be filled are successively presented to the valves during rotation of the valves and the tank. In such machines, the valve can either be cam operated, that is, it is opened and closed by engagement of the can with the valve, or it can be mechanically operated as controlled by cams or the like. The present invention is adaptable to either type of operation, as illustrated by the two embodiments of the invention disclosed.

It is highly desirable in such valves, that they be rapid in operation so that the number of cans filled per unit of time will be high, and it is also desirable that the valve operate without causing foaming of the liquid or without dripping, so as to insure accurate filling and to prevent loss of the liquid being filled. With some liquids, it is necessary to dismantle and clean the valves at frequent periodic intervals, so that it is also desirable that the valves be readily assembled and disassembled on the tank and that they can be assembled and taken apart easily. One serious problem encountered in known valves, lies in the corrosion occurring from the acids of the liquid being filled on the parts of the valve which are subjected to wear, and this problem is made more serious by the fact that most non-corrosive metals do not have good wearing characteristics. The life of a valve has been determined largely by the period of time in which undue corrosion will occur, or by the period of time in which non-corrosive metals will stand the wear involved during operation of the valve.

The valve disclosed herein is designed to overcome the foregoing difficulties and to provide a valve of simple construction which can be easily taken apart and reassembled, or removed from or placed on a tank, and which has an unusually long life due to the fact that no wearing surfaces of the valve are subjected to the corrosive effects of the liquid being filled. In addition to the foregoing advantages, the valve disclosed herein is adapted for rapid operation with non-foaming and non-dripping characteristics.

The embodiment illustrated in Figs. 1 through 5 discloses a valve of the automatic can-operated type wherein the filling and vent passages are opened and closed in accordance with the engagement and disengagement of a can with the valve. Generally, the valve comprises a body which is removably mounted in the bottom wall of the tank, a can lift member which is mounted for adjustment on the body, and passage forming means which extend through the can lift member and the valve body and are secured in or mounted on the upper wall of the tank above the liquid therein.

Referring to Figs. 1 to 3, the tank 10 is provided in its bottom wall with an apertured insert 11, suitably secured therein and provided with a frusto-conical seat 12 to receive the similarly formed upper end flange 13 of a tubular valve body 14, a sealing ring 15 of suitable resilient material, such as rubber, being seated in an annular groove in the flange 13 to seal the connection between the valve body and the tank. The valve body 14 slidably receives a can lift sleeve 16 which telescopes thereover, a sealing ring 17 being provided therebetween seated in an annular recess 18 of the valve body. The can lift sleeve 16 is threaded at its lower end to receive a can lift plate 21 in which a resilient can sealing ring 22 is mounted, and which is locked in adjusted position on the sleeve 16 by a locking nut 23. Intermediate its ends, the sleeve 16 is provided with an annular flange 24 to seat a spring 25 which has its other end engaged with the flange 13 of the valve body.

From the above description, it will be seen that the can lift sleeve is urged downwardly by the spring 25 and suitable means are provided for limiting the extent of this movement and determining the closed condition of the valve. For this purpose, the sleeve 16 is provided at its lower end with a frusto-conical seat 26 which engages the frusto-conical or bell-shaped fitting 27 at the lower end of a vent tube 28. The tube 28 extends upwardly through the sleeve 16, the valve body 14, and has its upper end mounted in a manner later described. The inner surface of frusto-conical fitting 27 is engaged when the valve is closed with a frusto-conical seat 31 on a fitting 32 secured at the lower end of a can release tube 33 which extends upwardly through the tube 28 and is mounted in the upper wall of the tank in a manner about to be described. The fittings 27 and 32 are provided with spaced radial lugs 34 and 35, respectively, whereby any tendency of the tubes 28 and 33 to get off center with respect to each other and the sleeve 16 is overcome. The lugs 34 and 35, however, have their ends normally out of frictional engagement with the adjacent walls of the sleeve 16 and the tube 28, respectively.

Tube 33 is threaded at its upper end to receive a sleeve extension 36 of a cap 37 which engages over the top wall 38 of the tank 10, the sleeve extension being freely received in a slot 39 formed in the tank wall. To maintain the tube 33 and the cap 37 in place, a conical washer 41 provided about the sleeve extension 36 is urged against the lower face of the wall 38 by a spring 42 which seats against a washer 43 secured between the sleeve extension 36 and a shoulder on the tube 33. Thus, the cap 37 and the washer 43 provide opposed gripping means whereby the upper end of the valve is removably seated in a fastening station on the wall of the tank, and can be removed therefrom by lifting the valve slightly and pulling the sleeve extension 36 out of the slot 39. It will be noted that the fitting 32 at the lower end of sleeve 33 provides a seat or stop toward which the fitting 27 and the can lift sleeve 16 are urged by the spring 25.

At the upper end of the tube 28, a sleeve cap 46 is provided and a spring 47 is interposed between the cap 46 and an annular flange 48 of the tube 33 whereby the tube 28 is urged upwardly with respect to the tube 33, but such movement is prevented in the closed position of the valve by the spring 25, which is considerably stronger than the spring 47. The sleeve cap 46 also carries a stud 51 threaded therein with its reduced upper end forming a valve cooperating with a passage 52 formed in the cap 37 and communicating with a passage 53 within the tube 33. On the stud 51 a sealing ring 54 of suitable material is provided, and the stud 51 is adjusted relative to the cap 46 so that the sealing ring is spaced from the lower surface of the cap 37 a distance equal to the spacing of the upper surface of the sleeve cap 46 from the washer 43, whereby when the washer 43 is engaged by the sleeve cap 46 as shown in Fig. 4, the stud 51 and its sealing ring 54 serve to close the passage 52 for a purpose later described.

From the above description, it will be seen that three passages are provided from the lower end of the valve, namely, a filling passage 56 opening from the tank and extending between the valve body 14 and the tube 28, a vent passage 57 between the tubes 33 and 28, and opening above the liquid level in the tank through apertures 58, and a can release passage 53 within the tube 33.

The operation of the valve, as previously stated, is entirely dependent on the engagement of a can with the can lift ring and such operation will now be described. The valve is shown in Fig. 1 in closed position where the filling passage 56 and the vent passage 57 are closed, while can release passage 53 is open. When a can is engaged with the ring 22 as shown in Fig. 4 at 59, the first part of the resulting upward movement of the can lift sleeve 16 from the position shown in Fig. 1 to that shown in Fig. 4 serves to open the vent passage 57, because the spring 47 expands to carry the tube 28 upwardly with the can lift sleeve 16, until it engages the washer 43 whereby the fitting 27 on the tube 28 remains engaged with its seat 26 but moves away from the fitting 32 to open the vent passage. At the same time that the vent passage is opened, it will be noted that the valve stud 51 has closed the can release passage 53.

Figures 4, 5:
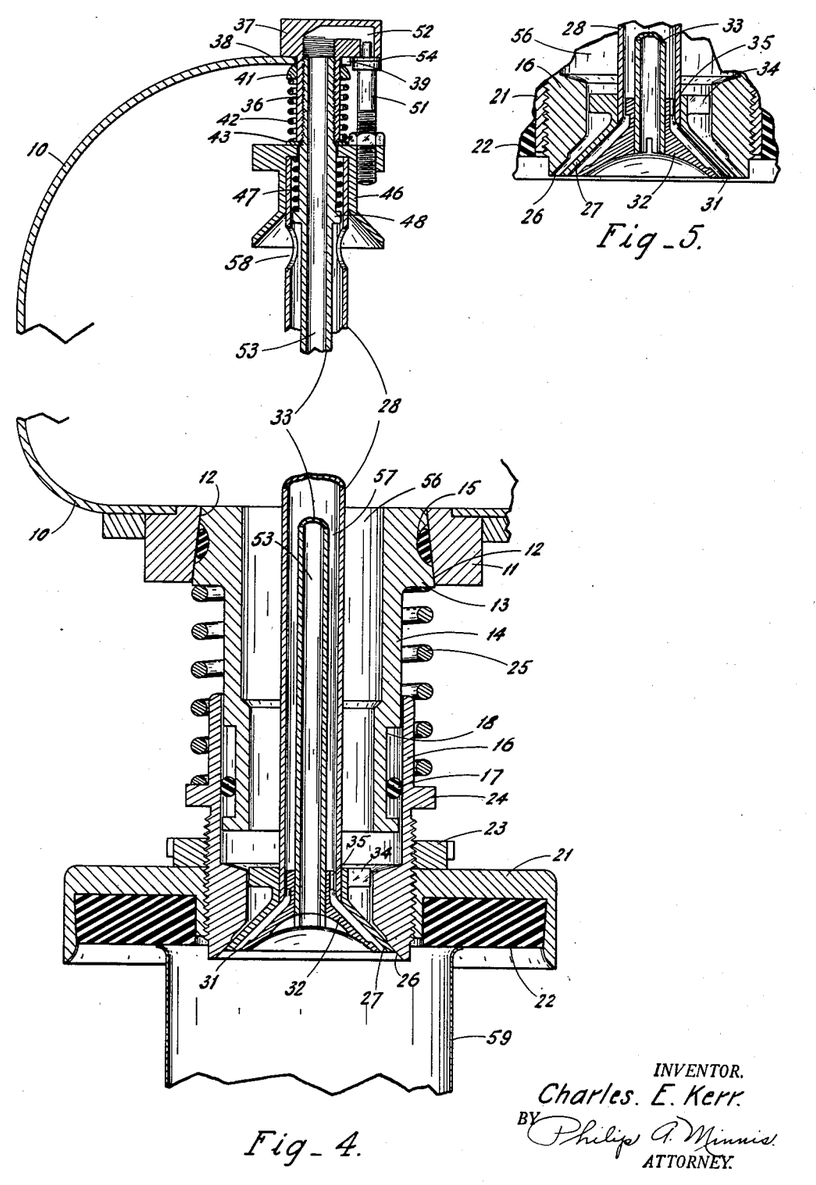
Fig. 4 is a sectional view similar to Fig. 1 showing the valve with a can engaged therewith and with the air vent open.
Fig. 5 is a fragmentary sectional view similar to Figs. 1 and 4, illustrating the lower end of the valve with both the vent and the filling passages open.

Continued upward movement of the can 59 causes the can lift sleeve 16 to move its seat 26 away from the fitting 27, further movement of which is prevented by the valve stud 51, to open the filling passage 56, as shown in Fig. 5, whereby a flow of liquid from the tank into the can occurs while the air in the can is exhausted through the vent passage 57. The filling operation will continue until the liquid reaches the port formed between the lower edges of the fitting 32 and the fitting 27, when no further air can flow back into the tank, and any subsequent flow of liquid from the tank will merely result in the equalizing of the level of the liquid in the tank and the vent passage 57.

As the can begins to recede from the valve, the first operation is to allow the spring 25 to become active to change the position of the parts from that shown in Fig. 5 with both the filling and vent passages open, to that in Fig. 4, where the filling passage 56 is closed, the vent passage 57 is open, and the can release passage 53 is still closed. Subsequent downward movement of the can will enable the spring 25 to compress the spring 47 and move the fitting 27 down against the fitting 32 to the position shown in Fig. 1, where the vent passage is also closed, and at the same time the can release passage 53 is opened by the withdrawal of the stud 51 and the sealing ring 54 from the passage 52 in the cap 37. This will result in trapping a certain amount of liquid in the vent passage 57, but because of the conical construction of the passage closing surfaces on the fittings 27 and 32, no after drip will occur. When the next can is presented to the valve, and the valve is operated thereby to open the vent passage as shown in Fig. 4, the liquid which is trapped in the vent passage 57 will be released into the can as the first part of the filling operation, which then continues as described above. During the filling operation, the generally conical or bell-shaped construction of the fitting 27 directs the flow of liquid outwardly against the walls of the tank to prevent foaming. It is to be noted that the construction and mounting of the valve locates all relatively sliding valve surfaces above the level of the liquid in the tank so that such surfaces are never contacted by the liquid and will not be subjected to any corrosive action. The valve construction also provides for easy mounting and removal of the valve with respect to the tank, as well as providing for assembly or disassembly of the valve without the use of tools. It will be noted that the valve has free endwise sliding movement relative to its seat in the tank during assembly and dis-assembly, and is urged against the seat by the spring 25.

The second embodiment of the invention shown in Figs. 6 through 13, illustrates a mechanically operated valve which attains the principal advantageous results noted in connection with the first form of my invention.

In this form of the invention, the valve is similar in construction and mounting to that first described, but has associated therewith a mechanical control means for automatically determining the open or closed position of the valve during the rotation of a valve with the tank, the control means including certain stationary cams or stops which cooperate with rotating controls associated with each valve.

Referring to Figs. 6 to 9 inclusive, the valve includes a body 71 which is threaded into the bottom wall 72 of a filling tank and is provided at its lower end with a threaded portion 73 to receive the can ring 74 and a lock nut 75 therefor, the can ring 74 having a sealing ring 75a of rubber or other resilient material mounted therein.

The valve body 71 (Fig. 6) is provided with a central bore 76 terminating at the bottom in a bell-shaped recess provided with a seat 77 at its lower edge for engagement by the bell-shaped lower end 78 of a tube 79 which extends upwardly through a bearing fitting 80 threaded in a bracket 81 (Figs. 6 and 7) suitably secured as by screws 82 on a vertical wall 83 of the tank. At its upper end, the tube 79 has a cap 84 secured thereon and a compression spring 86 is interposed between the cap 84 and the bracket 81, to urge the tube upwardly whereby the bell-shaped end 78 of the tube is maintained resiliently against its seat 77. The inner surface of the bell-shaped tube end 78 provides a seat for a similarly bell-shaped end 91 of a tube 92 extending upwardly through the tube 79, the spacing of the tubes from each other and the valve body 71 being maintained by radial spacing pins 93 (Figs. 6 and 9) mounted in the wall of the tube 79 and extending to either side thereof, and having their ends normally out of frictional engagement with the adjacent wall surfaces. At its upper end, the tube 92 (Figs. 6 and 8) is provided with a cap 96 suitably secured thereon and having a sliding fit within the tube 79. The cap 96 has a flanged head 97 extending outwardly beyond the cap 84 of the tube 79 to provide a seat for a spring 98 interposed between the head 97 and the bracket 81. The cap 96 is provided with a central bore communicating with the passage within the tube 92 and in which a valve slide 101 is mounted. The valve slide 101 has a head 102 on which a sealing ring 103 is suitably secured, a leaf spring 104 being interposed between the head 102 and the ring 103 to urge the valve slide 101 upwardly whereby the opposite apertures 106 therein are normally above the cap 96.

Figure 6:
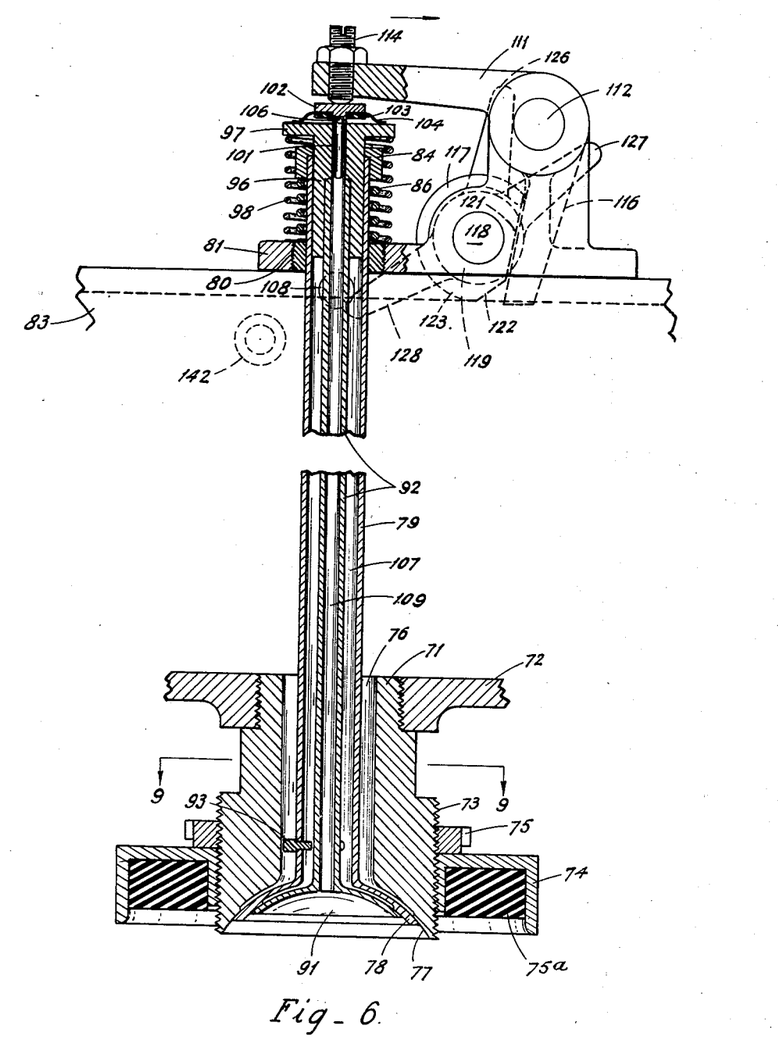
Fig. 6 is a vertical sectional view through a valve disclosing a second embodiment of the invention, the wall of the tank and certain control parts of the valve being shown in elevation.
Figure 7:
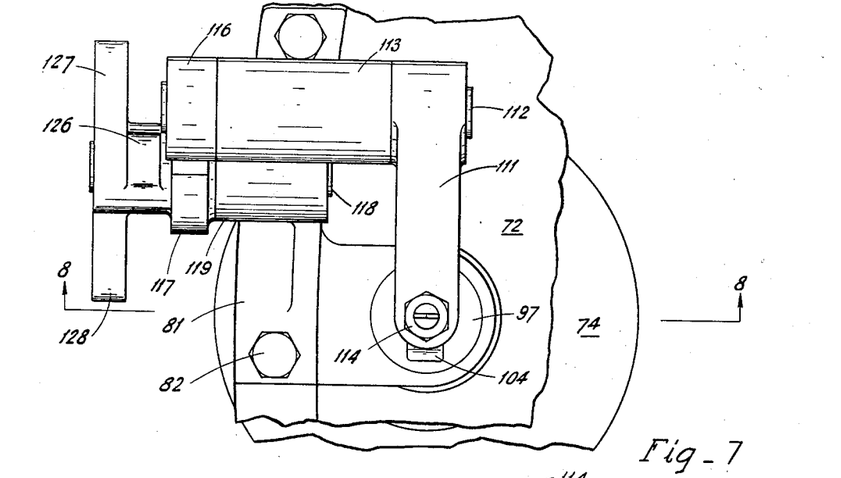
Fig. 7 is a fragmentary plan view of the valve and the control means therefor.
Figures 8, 9:
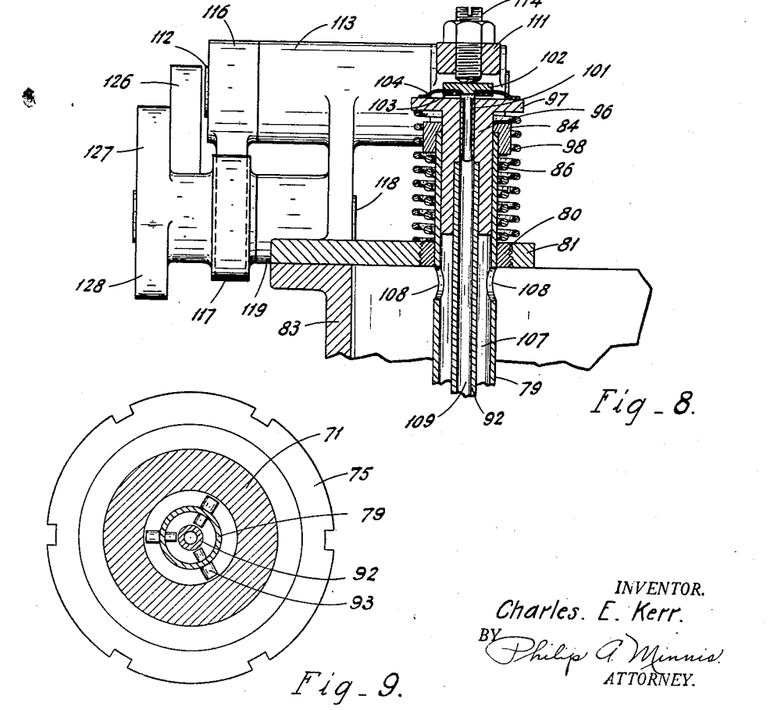
Fig. 8 is a sectional elevation of the upper part of the valve and its control mechanism, the view being taken in the plane of the line 8—8 in Fig. 7.
Fig. 9 is a horizontal sectional view of the valve taken in the plane of the line 9—9 in Fig. 6.

From the above description, it will be apparent that the bore 76 provides a filling passage which, as shown in Fig. 6, is closed by the engagement of the bell-shaped tube end 78 with its seat 77. A vent passage 107 between the tubes 79 and 92 as shown in Fig. 6 is closed by the engagement of the bell-shaped tube end 91 with its seat on tube end 78 and at the upper end opens into the tank above the level of the liquid through opposite apertures 108. Within the tube 92, a can release passage 109 is provided which is controlled at the top by the valve slide 101 in a manner later described.

It will also be noted that pressure applied on valve slide 101 will first serve to move the slide downwardly to close the can release passage 109 by engaging the sealing washer 103 with the cap 96, and then the cap 96 and its tube 92 will be moved downwardly against the tension of spring 98 until the cap flange 97 engages the cap 84 of the tube 79, which will then also partake of the further downward movement. Thus, pressure applied at the top, first closes the can release passage, then opens the vent passage and subsequently opens the filling passage, with the vent passage remaining open. If the pressure be relieved, it is apparent that the opposite sequence of operations will occur.

Means are provided for controlling the valve by applying pressure at the upper end thereof and such means may comprise a bell crank assembly including an arm 111 (Figs. 6, 7 and 8), secured at one end of a pivot pin 112 journalled in a boss 113 of the bracket 81, the arm 111 being provided with an adjustable locked set screw 114 for engagement with the head 102 of the valve slide 101. Pin 112 also carries an arm 116 of the bell crank assembly, which extends downwardly into operative relation with a cam 117 secured on a pin 118 journalled in a boss 119 of bracket 81 and having surfaces 121, 122 and 123 (Figs. 6 and 10) of varying radii. The pin 118 also has secured thereon respective arms 126, 127 and 128 which project outwardly of the tank wall 83 as seen more clearly in Figs. 7 and 8 for cooperation with certain stationary controlling elements, which can best be described in connection with the operation of the valve.

During a filling operation a can 130 (Fig. 10) is fed onto a can lift plate 131 in the usual manner and is lifted thereby into sealing engagement with the ring 75a. Preferably the plate 131 is slidably and yieldably mounted on a post 132 by means of a compression spring 133 interposed therebetween. At the beginning of the filling operation, the valve is closed as shown in Fig. 6, the arm 111 being held in its uppermost position by the engagement of the arm 116 with the cam surface 121 of shortest radii, the control arm 126 being in substantially upright position for cooperation with the control means therefor.

As a can moves into operative relation with a valve, control means for initiating the filling operation by opening the vent passage and closing the can release passage becomes effective, such control means preferably comprising a stop arm 136 (Figs. 10, 11 and 12) of a bell-crank pivoted on a stationary pin 137, and having an arm 138 which is selectively engaged with the notched upper end of a no-can-no-fill control lever 139. The lever 139 may be suitably controlled in a conventional manner so that when no can is fed to a lift plate 131, the lever 139 is moved out of engagement with the arm 138, so that the arms 138 and 136 are yieldable. The arm 136 lies in the path of travel of the control arm 126 during rotation of the tank, and is positioned so that it will be engaged by the arm 126 as a can is moved into operative relation with a valve.

Figures 10, 11, 12:
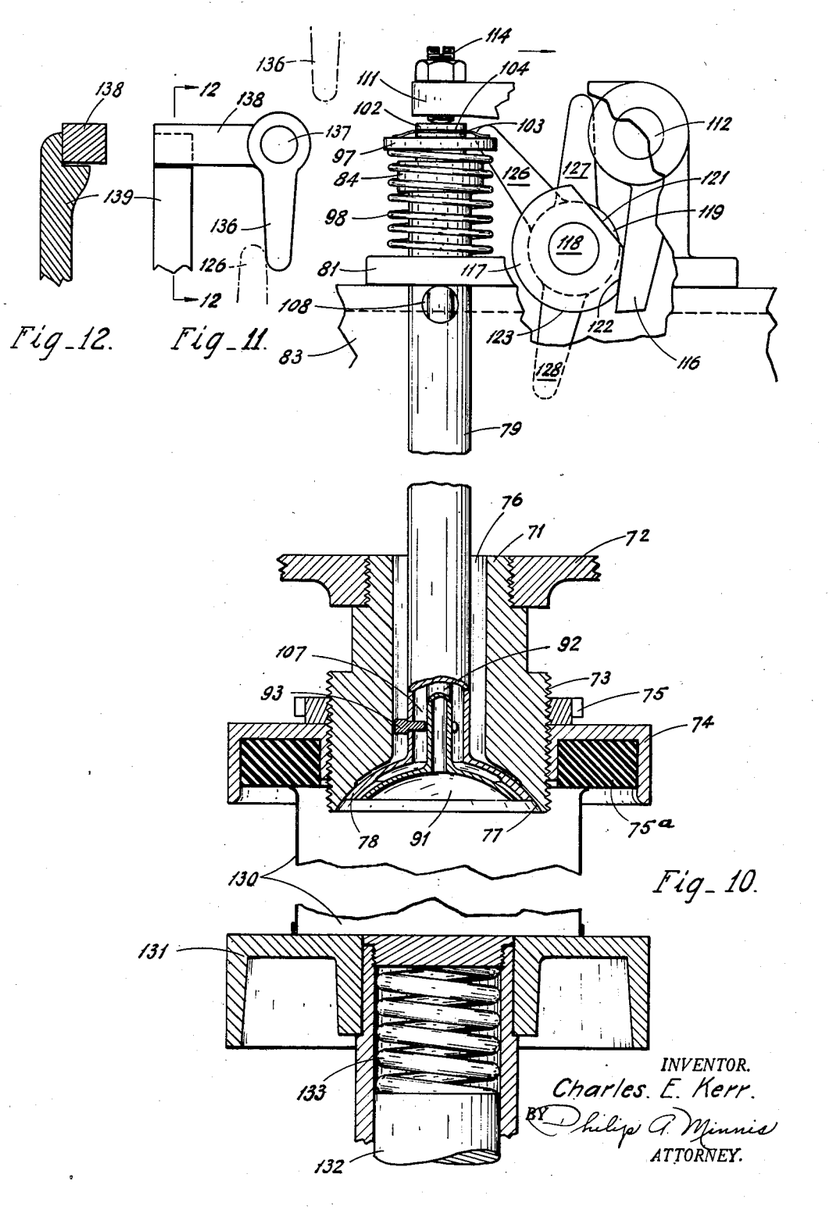
Fig. 10 is a sectional elevation of the valve and its control mechanism similar to Fig. 1, but showing the valve with a vent passage open.
Figs. 11 and 12 are fragmentary views of a part of the valve controlling mechanism, Fig. 12 being taken in the plane of the line 12—12 in Fig. 11.

When a can is fed to a lift plate 131, the no-can-no-fill lever 139 remains in engagement with the arm 138 whereby the arm 136 is non-yielding, and when contacted by the control lever 126 as shown in Fig. 11, will move the lever 126 from the position shown in Fig. 6 to that shown in Fig. 10. This rotation of lever 126 serves to rotate the cam 117 to engage the intermediate cam surface 122 thereof with the arm 116 whereby the arm 111 moves downwardly and in so doing, moves the valve slide 101 downwardly to close the can release passage 109, and moves the tube 92 downwardly to space its end 91 from the tube 78 to open the vent passage 107 as shown in Fig. 10. The opening of the vent passage 107 allows any liquid trapped therein to fall into the incoming can. It will be noted that the above described adjustment of the cam 117 results in positioning the control arm 127 thereof in upright active position.

Figures 13, 14:
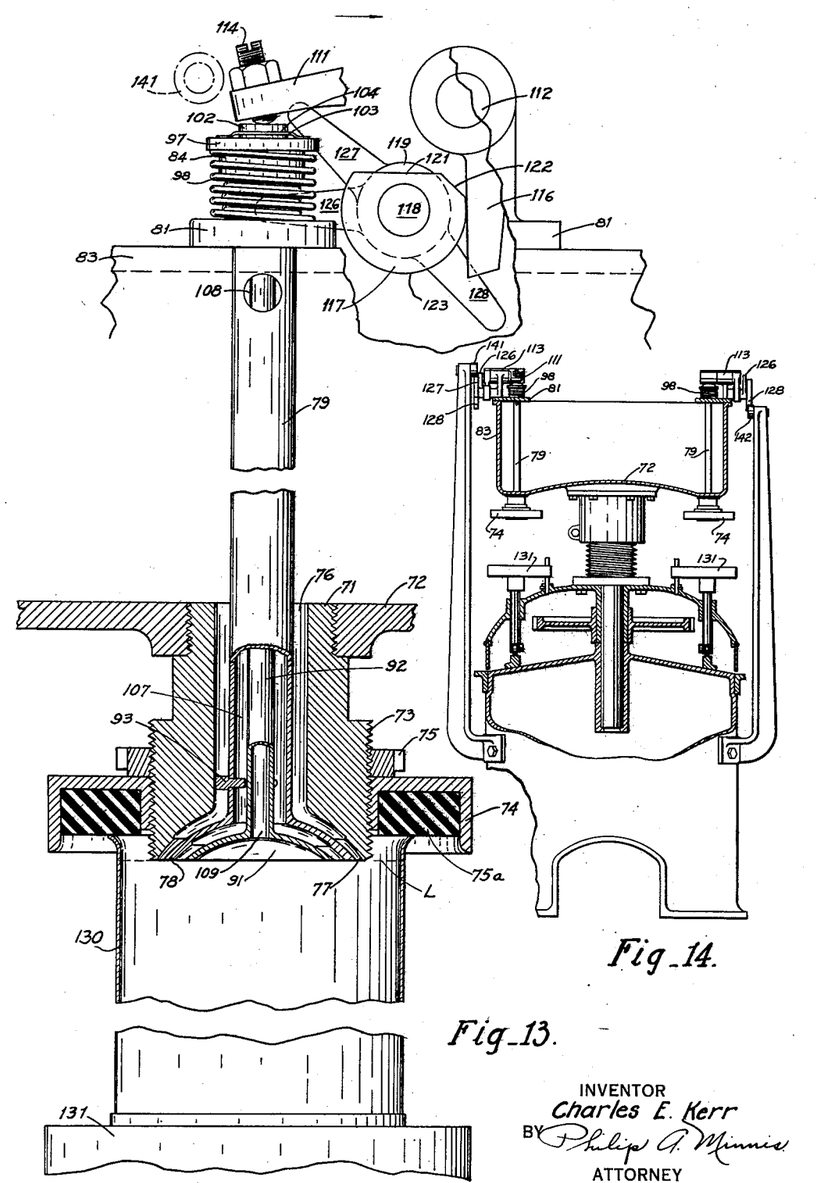
Fig. 13 is a sectional elevation similar to Figs. 6 and 10, but showing the valve and its control mechanism with both the vent and filling passages open.
Fig. 14 is a diagrammatic view of a filling machine embodying the present invention showing primarily the arrangement of the rotatable tank and the spaced stops therefor.

During the continued movement of the valve, a filling control means in the form of a stationary roller 141 (Fig. 13) is engaged by the control arm 127, whereby such is moved from the position shown in Fig. 10 to that shown in Fig. 13, the cam 117 being rotated to engage its surface 123 of greatest radius with the arm 117. The resulting rocking movement of the arms 117 and 111 to move the slide 101, tube 92, and tube 79 downwardly, whereby the end 78 of tube 79 is moved away from its seat 77 as shown in Fig. 13 to open the filling passage 76 and enable a flow of liquid from the tank to the can. This movement also places control 128 of the cam 117 in active position.

The filling operation continues during rotation of the tank until the liquid closes the vent passage 107 by rising to the level of the line L in Fig. 13, where it will be held by air trapped in the can and in the release passage 109. Obviously, the amount of fill may be varied by adjusting the can ring 74 on the valve body 71 and by correspondingly adjusting the set screw 114 in the arm 111 to keep the valve closed when conditioned as in Fig. 6.

After the liquid reaches the level L, some of the liquid will rise in the vent passage 107 until the valve closing control means becomes effective. Such control means may comprise a stationary roller 142 (Fig. 6) which is mounted in the path of travel of the control arm 128 so as to be contacted thereby and move from the position shown in Fig. 13 to that shown in Fig. 6, whereby the cam 117 is also restored to the position thereof shown in Fig. 6 and the valve is restored to closed position.

The above described cycle of operation will be repeated with each successive can as it is brought into operative relation with a valve.

While I have shown and described certain preferred embodiments of the invention, it is to be understood that the invention is capable of further variation and modification, and its scope, therefore, should be limited only by the scope of the appended claims.

I claim:

1. A filling machine comprising a tank having an apertured bottom wall and a side wall, a filling valve associated with said tank comprising valve body means secured in the aperture of said bottom wall and having free endwise sliding movement into and out of engagement therewith and a plurality of tubes operatively related to said valve body means and extending upwardly therethrough, said tubes having relative endwise movement controlled by bearing surfaces located adjacent their upper ends only, a slotted seat on said side wall adjacent the upper edge thereof, and an abutment at the upper ends of said tubes having horizontally slidable and overlapping engagement with said seat.

2. A filling machine comprising a tank having an apertured bottom wall and a side wall, a filling valve associated with said tank comprising valve body means secured in the aperture of said bottom wall and having free endwise sliding movement into and out of engagement therewith and a plurality of tubes operatively related to said valve body means and extending upwardly therethrough, said tubes having relative endwise movement controlled by bearing surfaces located adjacent their upper ends only, an apertured seat on said side wall adjacent the upper end thereof, and an abutment at the upper ends of said tubes for engagement with said seat by sliding movement and having horizontally overlapping engagement with said seat.

3. A filling machine comprising a tank having an apertured bottom wall and a side wall, a filling valve associated with said tank comprising valve body means secured in the aperture of said bottom wall and having free endwise sliding movement into and out of engagement therewith and a plurality of tubes operatively related to said valve body means and extending upwardly therethrough, the outer tube having a substantially frusto-conical lower end engaging a seat in said valve body means and an inner tube having a substantially frusto-conical seat engaging said outer tube end, said tubes having relative endwise movement with respect to each other and said body means and controlled by bearing surfaces located adjacent the upper ends of said tubes only, a slotted seat on said side wall adjacent the upper edge thereof, and an abutment at the upper ends of said tubes having horizontally slidable and overlapping engagement with said seat.

4. A filling machine comprising a tank having an apertured bottom wall and a side wall, a filling valve associated with said tank comprising valve body means secured in the aperture of said bottom wall and having free endwise sliding movement into and out of engagement therewith and a plurality of tubes operatively related to said valve body means and extending upwardly therethrough, the outer tube having a substantially frusto-conical lower end engaging a seat in said valve body means and an inner tube having a substantially frusto-conical seat engaging said outer tube end, said tubes having relative endwise movement with respect to each other and said body means and controlled by bearing surfaces located adjacent the upper ends of said tubes only, an apertured seat on said side wall adjacent the upper end thereof, and an abutment at the upper ends of said tubes for engagement with said seat by sliding movement and having horizontally overlapping engagement with said seat.

5. A filling machine comprising a tank having an apertured bottom wall and a side wall, valve body means mounted in an aperture of said wall and having free endwise sliding movement into and out of engagement therewith, a pair of telescoped tubes extending upwardly through said valve body means, the outer tube having an end seated against said valve body means to close the annular filling passage provided between said outer tube and said valve body means, and the inner tube having an end seated against said outer tube end to close the annular vent passage provided between said tubes, means associated with the upper ends of said tubes above the level of liquid in said tank to control relative movement therebetween, a slotted seat on said side wall adjacent the upper edge thereof, and an abutment at the upper ends of said tubes having horizontally slidable and overlapping engagement with said seat.

6. A filling machine comprising a tank having an apertured bottom wall, valve body means mounted in an aperture of said wall, a pair of telescoped tubes extending upwardly through said valve body means, the outer tube having an end seated against said valve body means to close the annular filling passage provided between said outer tube and said valve body means, and the inner tube having an end seated against said outer tube end to close the annular vent passage provided between said tubes, the passage within said inner tube providing a can release passage, means associated with the upper ends of said tubes above the level of liquid in said tank to control relative movement therebetween, and valve means at the upper end of said inner tube for closing the upper end of said can release passage during filling of a can by the valve.

7. A filling machine comprising a tank having an apertured bottom wall, a valve associated with an aperture in said bottom wall and having free endwise sliding movement into and out of engagement therewith comprising a body member and a pair of telescoped tube members, each of said members having an enlarged seat at its lower end with the seat of the outer tube member interposed between the respective seats of said inner tube and body members, said inner one of said members adjacent its upper end having a horizontally slidable interlocking connection with said tank and thereby being stationary relative to the other members to form a stop therefor, and spring means urging said movable members to maintain said seats engaged to determine the closed condition of the valve, said tube members having relative sliding engagement at their upper ends only above the level of liquid in said tank.

8. A filling machine comprising a tank having an apertured bottom wall, a valve associated with an aperture in said bottom wall and having free endwise sliding movement into and out of engagement therewith comprising a body member and a pair of telescoped tube members, each of said members having an enlarged seat at its lower end with the seat of the outer tube member interposed between the respective seats of said inner tube and body members, said inner one of said members adjacent its upper end having a horizontally slidable interlocking connection with said tank and thereby being stationary relative to the other members to form a stop therefor, spring means urging said movable members to maintain said seats engaged to determine the closed condition of the valve, said tube members having relative sliding engagement at their upper ends only above the level of liquid in said tank, and stop means between said tube members for limiting relative movement therebetween.

9. A filling machine comprising a tank having an apertured bottom wall, valve body means comprising a stationary body member seated for free removal in an aperture of said wall and having free endwise sliding movement into and out of engagement therewith and a movable body member telescoping thereover, spring means urging said movable body member downwardly and holding said valve body in its seat, a stationary tube having a substantially frusto-conical lower end and having its upper end secured above the level of liquid in said tank, and a movable tube telescoping over said stationary tube and having a substantially frusto-conical end interposed between said stationary tube end and a substantially frusto-conical seat on said movable body member, whereby said inner tube forms a stop for said outer tube and said movable body member.

10. A filling machine comprising a tank having an apertured bottom wall, valve body means comprising a stationary body member seated for free removal in an aperture of said wall and having free endwise sliding movement into and out of engagement therewith and a movable body member telescoping thereover, spring means urging said movable body member downwardly and holding said valve body in its seat, a stationary tube having a substantially frusto-conical lower end and having its upper end secured above the level of liquid in said tank, a movable tube telescoping over said stationary tube and having a substantially frusto-conical end interposed between said stationary tube end and a substantially frusto-conical seat on said movable body member, and other spring means normally compressed by said first-named spring means for urging said outer tube upwardly relative to said inner tube.

11. A filling machine comprising a tank having an apertured bottom wall, valve body means comprising a stationary body member seated in an aperture of said wall and a movable body member telescoping thereover, spring means urging said movable body member downwardly, a stationary tube having a substantially frusto-conical lower end and having its upper end secured above the level of liquid in said tank, a movable tube telescoping over said stationary tube and having a substantially frusto-conical end interposed between said stationary tube end and a substantially frusto-conical seat on said movable body member, other spring means normally compressed by said first-named spring means for urging said outer tube upwardly relative to said inner tube, and means carried by said outer tube for closing the upper end of the passage through said inner tube.

12. A filling machine comprising a tank having an apertured bottom wall, valve body means comprising a stationary body member seated for free removal in an aperture of said wall and having free endwise sliding movement into and out of engagement therewith and a movable body member telescoping thereover, spring means urging said movable body member downwardly and holding said valve body in its seat, a stationary tube having a substantially frusto-conical lower end and having its upper end secured above the level of liquid in said tank, a movable tube telescoping over said stationary tube and having a substantially frusto-conical end interposed between said stationary tube end and a substantially frusto-conical seat on said movable body member, other spring means normally compressed by said first named spring means for urging said outer tube upwardly relative to said inner tube, and a stop on said inner tube for limiting the upward movement of said outer tube.

13. A filling machine comprising a tank having an apertured bottom wall and a side wall, valve body means pressed into an aperture of said bottom wall for free removal therefrom, passage forming means cooperating with said valve body means and extending upwardly therethrough, and a control valve for said passage forming means on the upper end thereof, having an apertured seat and a valve member for engagement with said seat by sliding movement and having horizontally overlapping engagement with said seat.

14. A filling machine comprising a tank having an apertured bottom wall, valve body means removably secured in an aperture of said bottom wall, passage forming means cooperating with said valve body means and extending upwardly therethrough, relatively movable spring urged gripping means at the upper end of said passage forming means, and stationary supporting means for gripping engagement by said gripping means.

15. A filling machine comprising a tank having an apertured bottom wall, a valve body mounted in an aperture of said wall, a pair of telescoped tubes having seats cooperating with each other and a seat on said body, said tubes extending upwardly through said body and said tank, bracket means above the level of liquid in said tank for slidably receiving said tubes, spring means for urging each of said tubes upwardly, and cam control means for said tubes for depressing said tubes sequentially.

16. A filling machine comprising a tank having an apertured bottom wall, a valve body mounted in an aperture of said wall, a pair of telescoped tubes having seats cooperating with each other and a seat on said body, said tubes extending upwardly through said body and said tank, bracket means above the level of liquid in said tank for slidably receiving said tubes, spring means for urging each of said tubes upwardly, an arm for depressing said tubes, and a cam for controlling movement of said arm.

17. A filling machine comprising a tank having an apertured bottom wall, a valve body mounted in an aperture of said wall, a pair of telescoped tubes having seats cooperating with each other and a seat on said body, said tubes extending upwardly through said body and said tank, bracket means above the level of liquid in said tank for slidably receiving said tubes, spring means for urging each of said tubes upwardly, a cam having respective surfaces of varying radii, and a bellcrank having one arm associated with said tubes and another arm associated with said cam.

18. A filling machine comprising a rotatable tank having an apertured bottom wall, a valve body mounted in an aperture of said wall, a pair of telescoped tubes having seat means at the lower ends thereof, the outer tube seat means engaging a seat on said body and the inner tube seat means engaging said outer tube seat means, bracket means above the level of liquid in said tank, said tubes extending upwardly through said valve body and said bracket means, spring means for urging each of said tubes upwardly, means for controlling sequential raising and lowering of said tubes, and operating means for said controlling means spaced about said tank.

19. A filling machine comprising a rotatable tank having an apertured bottom wall, a valve body mounted in an aperture of said wall, a pair of telescoped tubes having seat means at the lower ends thereof, the outer tube seat means engaging a seat on said body and the inner tube seat means engaging said outer tube seat means, bracket means above the level of liquid in said tank, said tubes extending upwardly through said valve body and said bracket means, spring means for urging each of said tubes upwardly, means for controlling sequential raising and lowering of said tubes including a cam and a plurality of control arms therefor, and operating means for said controlling means including a plurality of stops spaced about said tank for successive engagement with said control arms.

20. A filling machine comprising a rotatable tank having an apertured bottom wall, a valve body mounted in an aperture of said wall, a pair of telescoped tubes having seat means at the lower ends thereof, the outer tube seat means engaging a seat on said body and the inner tube seat means engaging said outer tube seat means, bracket means above the level of liquid in said tank, said tubes extending upwardly through said valve body and said bracket means, and spring means for urging each of said tubes upwardly, the annular space between the outer tube and said body providing a filling passage, the annular space between said tubes providing a vent passage, and said inner tube providing a can release passage.

21. A filling machine comprising a rotatable tank having an apertured bottom wall, a valve body mounted in an aperture of said wall, passage forming means extending upwardly through said valve body and having seat means at the lower end for engagement with a seat on said body, said passage forming means providing separate filling and vent passages therethrough, bracket means on said tank located above the level of liquid in said tank for connection with the upper end of said passage forming means, and means associated with the upper end of said passage forming means for controlling sequential opening and closing of said vent and filling passages.

22. A filling machine comprising a rotatable tank having an apertured bottom wall, a valve body mounted in an aperture of said wall, passage forming means extending upwardly through said valve body and having seat means at the lower end for engagement with a seat on said body, said passage forming means providing separate filling and vent passages therethrough, bracket means on said tank located above the level of liquid in said tank for connection with the upper end of said passage forming means, means associated with the upper end of said passage forming means for controlling sequential opening and closing of said vent and filling passages, and operating means for said controlling means spaced about said tank.

23. A filling machine comprising a tank having an apertured bottom wall, a valve body mounted in an aperture of said wall, a set of passage forming means having seats cooperating with each other and a seat on said body, said passage forming means extending upwardly through said body and said tank, bracket means above the level of liquid in said tank for slidably receiving said passage forming means, spring means for urging each of said passage forming means upwardly, and control means for operating said passage forming means sequentially.

24. A filling machine comprising a tank, a valve associated with said tank including a valve body, a pair of telescoped tubes having seats cooperating with each other and a seat on said body, said tubes extending upwardly through said body, bracket means on said tank for slidably receiving said tubes, spring means for urging each of said tubes upwardly, an arm for depressing said tubes, and a cam for controlling movement of said arm.

25. A filling machine comprising a rotatable tank, a valve body mounted on said tank, a pair of telescoped tubes having seat means at the lower ends thereof, the outer tube seat means engaging a seat on said body and the inner tube seat means engaging said outer tube seat means, bracket means on said tank, said tubes extending upwardly through said valve body and said bracket means, spring means for urging each of said tubes upwardly, means for controlling sequential raising and lowering of said tubes, and operating means for said controlling means spaced about said tank.

26. A filling machine comprising a rotatable tank, a valve body mounted on said tank, a pair of telescoped tubes having seat means at the lower ends thereof, the outer tube seat means engaging a seat on said body and the innr tube seat means engaging said outer tube seat means, bracket means on said tank, said tubes extending upwardly through said valve body and said bracket means, spring means for urging each of said tubes upwardly, means for controlling sequential raising and lowering of said tubes including a cam and a plurality of control arms therefor, and operating means for said controlling means including a plurality of stops spaced about said tank for successive engagement with said control arms.

27. A filling machine comprising a tank, an apertured valve seat on the bottom wall of said tank, a valve body engaged with said seat, an apertured seat on the side wall of said tank in alignment with said valve seat and above the level of liquid in said tank, a stop member extending upwardly through said valve body for free detachable sliding engagement with said side wall seat, and connecting means between said stop member and said body including spring means interposed therebetween, said spring means serving to urge said valve body and said stop member against the respective seats engaged therewith to maintain said valve in position on said tank.

28. A filling machine comprising a tank, an apertured valve seat on the bottom wall of said tank, a valve body engaged with said seat, an apertured valve seat on the side wall of said tank in alignment with said bottom wall seat and above the level of liquid in said tank, passage forming means cooperating with said valve body and extending upwardly therethrough, relatively movable spring-urged gripping means at the upper end of said passage forming means for engagement with said side wall valve seat, and connecting means between said passage forming means and said valve body including spring means interposed therebetween, said spring means serving to urge said valve body and said stop member against the respective seats engaged therewith to maintain said valve in position on said tank.

29. A filling machine comprising a tank, a valve seat on the bottom of said tank, a valve body engaged with said valve seat, an apertured seat on the side wall of the tank, a stop member extending upwardly through said valve body for free detachable sliding engagement with said apertured seat, and resilient means between the valve body and said stop member for urging said valve body and stop member into engagement with their respective seats.

CHARLES E. KERR.